United States Patent
Stephan et al.

(10) Patent No.: US 10,594,500 B2
(45) Date of Patent: Mar. 17, 2020

(54) METHOD AND DEVICE FOR MANAGING PACKETS IN A MULTI-STREAM AND MULTI-PROTOCOL CONNECTION

(71) Applicant: Orange, Paris (FR)

(72) Inventors: Emile Stephan, Pleumeur Bodou (FR); Arnaud Braud, Lannion (FR); Joel Penhoat, Lannion (FR)

(73) Assignee: ORANGE, Paris (FR)

( * ) Notice: Subject to any disclaimer, the term of this patent is extended or adjusted under 35 U.S.C. 154(b) by 17 days.

(21) Appl. No.: 15/737,589

(22) PCT Filed: Jun. 16, 2016

(86) PCT No.: PCT/FR2016/051464
§ 371 (c)(1),
(2) Date: Dec. 18, 2017

(87) PCT Pub. No.: WO2016/203161
PCT Pub. Date: Dec. 22, 2016

(65) Prior Publication Data
US 2018/0183615 A1    Jun. 28, 2018

(30) Foreign Application Priority Data
Jun. 18, 2015 (FR) ..................... 15 55606

(51) Int. Cl.
*H04L 12/18* (2006.01)
*H04L 29/06* (2006.01)
*H04L 29/08* (2006.01)
*H04L 12/801* (2013.01)

(52) U.S. Cl.
CPC .............. *H04L 12/18* (2013.01); *H04L 47/11* (2013.01); *H04L 69/14* (2013.01); *H04L 69/16* (2013.01);
(Continued)

(58) Field of Classification Search
None
See application file for complete search history.

(56) References Cited

U.S. PATENT DOCUMENTS 6,359,882 B1    3/2002 Robles et al.
6,982,975 B1 *  1/2006 Aramaki ................ H04L 49/15
                                              340/2.21

(Continued)

OTHER PUBLICATIONS

English translation of the Written Opinion of the International Searching Authority dated Dec. 19, 2017 for corresponding International Application No. PCT/FR2016/051464, filed Aug. 29, 2016.

(Continued)

*Primary Examiner* — Christine T Duong
(74) *Attorney, Agent, or Firm* — David D. Brush; Westman, Champlin & Koehler, P.A.

(57) ABSTRACT

A method and a device are provided for managing, in a receiving entity, data packets received from a transport layer connection established with a transmitting entity. The connection includes at least one stream in connected mode and at least one stream in non-connected mode. The management method includes transmitting, by the receiving entity, a so-called return message, relating to at least one data packet from one of the two streams in connected mode or in non-connected mode of the connection, the return message being transmitted to the transmitting entity on the other stream of the connection.

4 Claims, 3 Drawing Sheets

Figure 1:
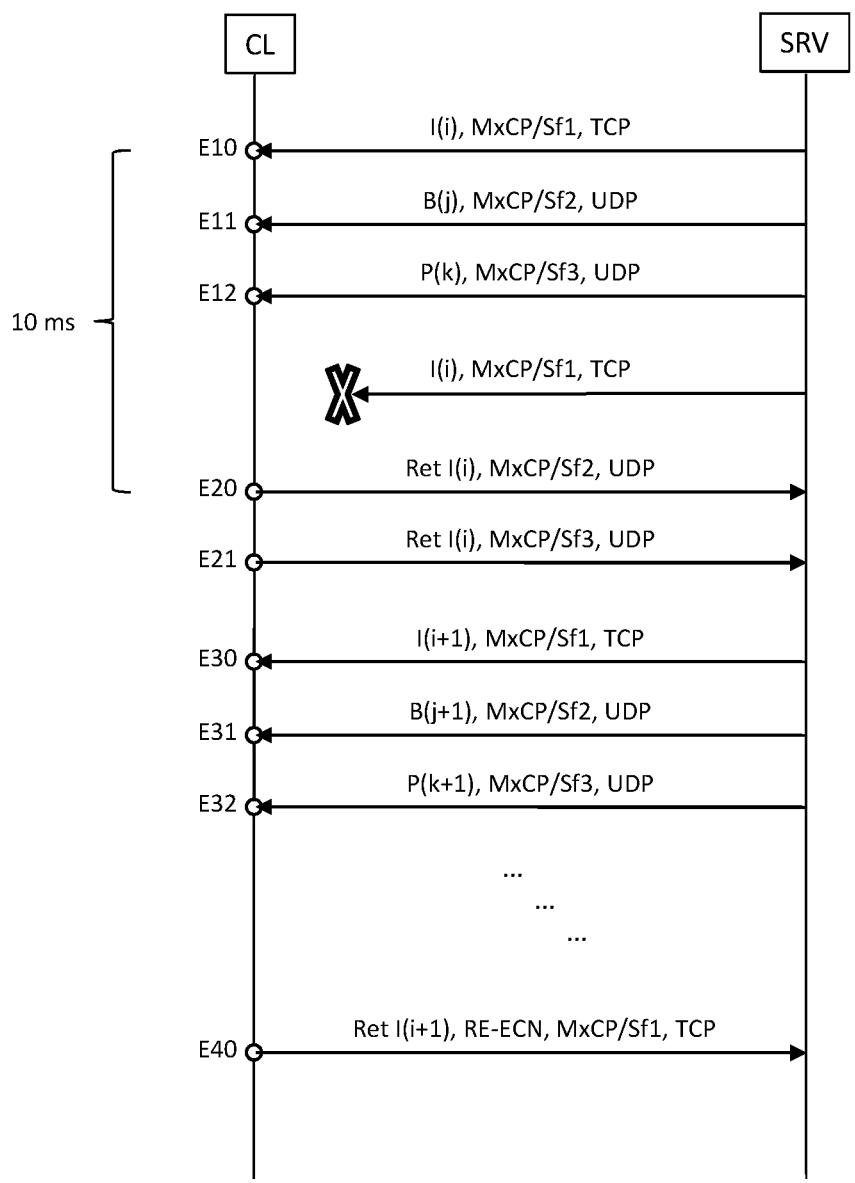

(52) U.S. Cl.
CPC ............ *H04L 69/165* (2013.01); *H04L 69/22* (2013.01); *H04L 69/326* (2013.01)

(56) References Cited

U.S. PATENT DOCUMENTS

| | | |
|---|---|---|
| 2007/0002863 A1 | 1/2007 | Black |
| 2012/0047279 A1* | 2/2012 | Zhu ................... H04L 47/11 709/231 |
| 2013/0201846 A1 | 8/2013 | Bichot et al. |
| 2015/0222555 A1* | 8/2015 | Rickeby ............. H04L 47/34 370/230 |
| 2016/0344631 A1* | 11/2016 | Krishnamurthy ..... H04L 47/115 |

OTHER PUBLICATIONS

International Search Report dated Aug. 29, 2016 for corresponding International Application No. PCT/FR2016/051464, filed Aug. 29, 2016.

A. Ford et al., "TCP Extensions for Multipath Operation with Multiple Addresses", Jan. 2013, RFC 6824.

L-A, Larson et al., "The Lightweight User Datagram Protocol (UDP-Lite)", Jul. 2004, RFC 3828.

K. Ramakrishnan et al., "The Addition of Explicit Congestion Notification (ECN) to IP", Sep. 2001, RFC 3168.

M. Westerlund et al., "Explicit Congestion Notification (ECN) for RTP over UDP", Aug. 2012, RFC 6679.

H. Holbrook et al., "Source-Specific Multicast for IP", Aug. 2006, RFC 4607.

B. Fenner et al., "Protocol Independent Multicast—Sparse Mode (PIM-SM): Protocol Specification (Revised)", Aug. 2006, RFC 4601.

B. Cain et al., "Internet Group Management Protocol, Version 3", Oct. 2002, RFC 3376.

J. Rosenberg et al., STUN—Simple Traversal of User Datagram Protocol (UDP) Through Network Address Translators (NATs), Mar. 2003, RFC 3489.

* cited by examiner

METHOD AND DEVICE FOR MANAGING PACKETS IN A MULTI-STREAM AND MULTI-PROTOCOL CONNECTION

1. CROSS-REFERENCE TO RELATED APPLICATIONS

This Application is a Section 371 National Stage Application of International Application No. PCT/FR2016/051464, filed Jun. 16, 2016, the content of which is incorporated herein by reference in its entirety, and published as WO 2016/203161 on Dec. 22, 2016, not in English.

2. FIELD OF THE INVENTION

The application for invention lies in the field of connections, in connected or connectionless mode, between entities of a packet-switched network, and more particularly connections each comprising a plurality of streams taking paths with different characteristics.

3. PRIOR ART

Applications wishing to benefit from optimized transport resources are able to use a connection jointly using a plurality of different paths between two and the same ends, for example between a client and a server. Thus, if one of the paths taken is congested, the traffic generated by the application is able to take the other paths. This thereby improves the quality of service. This principle has been standardized by the IETF (Internet Engineering Task Force) with MPTCP (MultiPath Transmission Control Protocol) in rfc6824 (request for comments).

MPTCP is an extension of TCP (Transmission Control Protocol), in which each end has a plurality of IP (Internet Protocol) addresses and is thus able to combine a plurality of TCP substreams into the same main stream, each substream taking paths that are set up independently of one another.

For what are termed "real-time" applications, such as Voice over IP or Television over IP, a problem is caused by the fact that, in the TCP protocol, packets are sent solely after acknowledgement of the receipt of the preceding packets. Specifically, this causes some of the TCP substreams of MPTCP to be slowed or interrupted, thereby making the transmission quality unacceptable for this type of application. In addition, the number of retransmission packets, representing around 3% of the bit rate, increases the total required bit rate and increases congestion in the buffers of the devices being passed through. The advantage, in terms of bit rate, of combining a plurality of streams within one and the same connection by virtue of MPTCP is therefore not always felt in the case of real-time applications.

In addition, while it is true that "real-time" applications are also able to use the UDP (User Datagram Protocol) protocol, which is in connectionless mode, it is not possible to manage congestion problems using this protocol.

One of the aims of the invention is to remedy these drawbacks of the prior art.

4. SUMMARY

The invention improves the situation by way of a method for managing, in a receiving entity, data packets received from a transport layer connection set up with a sending entity, in which the connection comprises at least one stream in connected mode and at least one stream in connectionless mode, and in which the management method comprises a step of sending, by the receiving entity, of a message, termed a return message, relating to at least one data packet from one of the two streams, in connected mode or in connectionless mode, of the connection, the return message being sent to the sending entity on the other stream of the connection.

A connection in connected mode requires, in order to set it up, a preliminary phase of negotiation between the ends, but the transmission of the data is reliable. A connection in connectionless mode does not require this preliminary negotiation, but the transmission of the data is less reliable.

By virtue of the invention, if, in a multi-stream connection, a stream of one of the two types, connected or connectionless, is suffering from a delay upon arrival in the receiving entity, the latter is able to prompt, by way of the return message, a corrective action in the sending entity without depending on this type of stream, this having an inherent advantage as the reliability of the type of stream in question is impacted a priori. Specifically, in contrast to the prior art, an indication of congestion or a resumption order is carried by the return message, which message is sent on a stream in connectionless mode if the stream being received is in connected mode, or vice versa. It is thus possible for the sending and receiving entities to benefit from the advantages both of the connected mode and of the connectionless mode.

It is useful to note that, in this document, the desired meaning of the expression "return message" is similar to that of "feedback message" in English.

According to one aspect of the invention, the stream in connected mode is a TCP stream.

The stream in connectionless mode may be a UDP stream, a UDP-lite stream in accordance with rfc3828, or a stream similar to UDP but capable of transmitting an identifier corresponding to a read pointer. For convenience, the expression "UDP stream" is used in place of "stream in connectionless mode" in the cases where UDP or UDP-lite are able to be used without modification.

The management method according to the invention has numerous other advantages, which are examined in the various following scenarios.

For example, if a TCP stream of the multi-stream connection is congested, the receiving entity reports the congestion on a UDP stream, and does so even if the TCP stream has activated what is termed the ECN (Explicit Congestion Notification, rfc3168) function and therefore has provision to use the ECN-Echo flag (section 6.1.2 of rfc3168) in the reverse direction in order to report congestion, as the congestion may be such that returning the indication of congestion in accordance with the prior art, that is to say in the direction opposite to the TCP stream, has no effect.

According to the invention, this indication (ECN-Echo flag) is sent in the ECN bits of the IP header of the packets via the UDP stream in the return message, with the effect that the sending entity, inter alia, will reduce for example the bit rate of the congested TCP stream.

In another example, conversely, if a UDP stream is congested, the receiving entity may prompt the retransmission of pending packets by sending, on the TCP stream, a return message indicating this congestion.

According to one aspect of the invention, the receiving entity sends the return message on the stream in connectionless mode, and the return message relates to the TCP stream.

According to one aspect of the invention, the return message comprises a read pointer to a data packet of the TCP stream.

By virtue of this aspect, the receiving entity is able to order the sending entity to abandon the transmission of unreceived data in the TCP stream and to resume the transmission beyond unreceived data, this not being possible in the prior art, which uses the opposite direction of the same TCP stream and a pointer that mandatorily guarantees the retransmission of all of the data of the TCP stream.

According to one aspect of the invention, the return message comprises an indication of congestion of the TCP stream.

According to one aspect of the invention, the return message comprises an ECN-Echo flag.

By virtue of this aspect, congestion on a TCP stream is able to be reported by the receiving entity to the sending entity via the UDP stream, for example in the header of the RTP layer above UDP (rfc6679). This is particularly useful if the TCP stream is congested to the point that the transmission of the return message via this same stream is compromised.

According to one aspect of the invention, an ECN field of an IP header of the return message carries the value of the ECN-Echo flag.

By virtue of this aspect, as before and with the same usefulness, congestion on a TCP stream is able to be reported by the receiving entity to the sending entity via the UDP stream. In this particular implementation, when the ECN function is not activated on the received UDP stream (ECN bits set to 00), that is to say even if there is no ECT flag in the IP header, the ECN-Echo indication of congestion is reported to the sender in the IP header (rfc3168, section 5) by setting the 2 bits of the ECN field to a non-zero value, for example to 11. This goes against the preconceptions of those skilled in the art in two ways as, firstly, the flags of the ECN field are used in the reverse direction, that is to say to report received congestion to the sending entity and not to the receiving entity, and, secondly, the indication is transported at the level of the network layer, and not of a higher layer. The indication is therefore able to be seen by the network layer.

According to one aspect of the invention, the receiving entity sends the return message on the TCP stream, and the return message relates to the stream in connectionless mode.

According to one aspect of the invention, the return message comprises a read pointer to a data packet of the stream in connectionless mode.

By virtue of this aspect, packets that a UDP stream has definitively lost are able to be resent, for example via another TCP stream of the same connection. The receiving entity simply needs to be capable of identifying the data block starting from which the transmission resumes, in order to reconstruct the initial sequence. This enables for example multicast IPTV services to avoid image distortions following losses of data. The receiver recovers lost data that are not able to be retransmitted on the multicast portion in unicast.

According to one aspect of the invention, the return message comprises an ECN-Echo flag.

By virtue of this aspect, congestion on a UDP stream is able to be reported by the receiving entity to the sending entity via the TCP stream.

In addition, this enables the activation of ECN in a UDP stream (ECT bit of the IP header set to 1) and the reporting of the ECN-Echo congestion without implementing RTP, RTCP and rfc6679. This is in contrast to the prior art, in which congestion on a UDP stream is not able to be reported without implementing the reporting mechanism on an additional protocol layer.

According to one aspect of the invention, the stream in connectionless mode is of unidirectional multicast IP type, with an ECT bit activated in IP headers of the packets of the stream.

By virtue of this aspect, congestion on one of the branches of a multicast UDP stream is able to be reported via ECN-Echo on the TCP connection by a receiving entity. This is in contrast to the prior art, in which congestion on a multicast UDP stream is not able to be reported. If the TCP connection is used by a receiver representative of the multicast group, this makes it possible to manage the adaptation of the bit rates sent to the whole group of terminals at a low cost.

According to another aspect, the sent UDP stream is of unidirectional multicast IP type, and the connection is set up on a PIM SM (Source Specific Multicast for IP-Sparse Mode, rfc4607, rfc4601) IP network, to which the receiving entity sends a message equivalent to the IGMP (Internet Group Management Protocol, rfc3376) message to register in the multicast group. The method replaces the IGMP message with a TCP message SYN containing the option MxCP CAPABLE having the "read-only" and "multicast" flags raised. This message is sent when the TCP stream is set up and is therefore easy to intercept using a multicast network function responsible for registering the receivers. By virtue of this aspect, the method adapts simply to an existing multicast network, without the need to implement IGMP.

The various aspects of the management method that have just been described are able to be implemented independently of one another or in combination with one another.

The invention also relates to a device for managing, in a receiving entity, data packets received from a connection set up with a sending entity, comprising a first sending/receiving module able to send and receive a stream in connected mode and a second sending/receiving module able to send and receive a stream in connectionless mode, in which the connection comprises at least one stream in connected mode and at least one stream in connectionless mode, and in which one of the first or second sending/receiving modules sends a message, termed a return message, relating to at least one data packet received by the other sending/receiving module.

This device, able in all of its embodiments to implement the management method that has just been described, is intended to be implemented in an entity receiving a data stream, whether this be in connected mode or in connectionless mode, this receiving entity generally comprising an application module consuming the received data.

The invention also relates to a computer program comprising instructions for the implementation of the steps of the management method that has just been described when this program is executed by a processor.

The invention relates finally to a recording medium readable by a management device and on which the program that has just been described is recorded, being able to use any programming language, and be in the form of source code, object code, or of intermediate code between source code and object code, such as in a partially compiled form, or in any other desirable form.

5. PRESENTATION OF THE FIGURES

Figure 2:
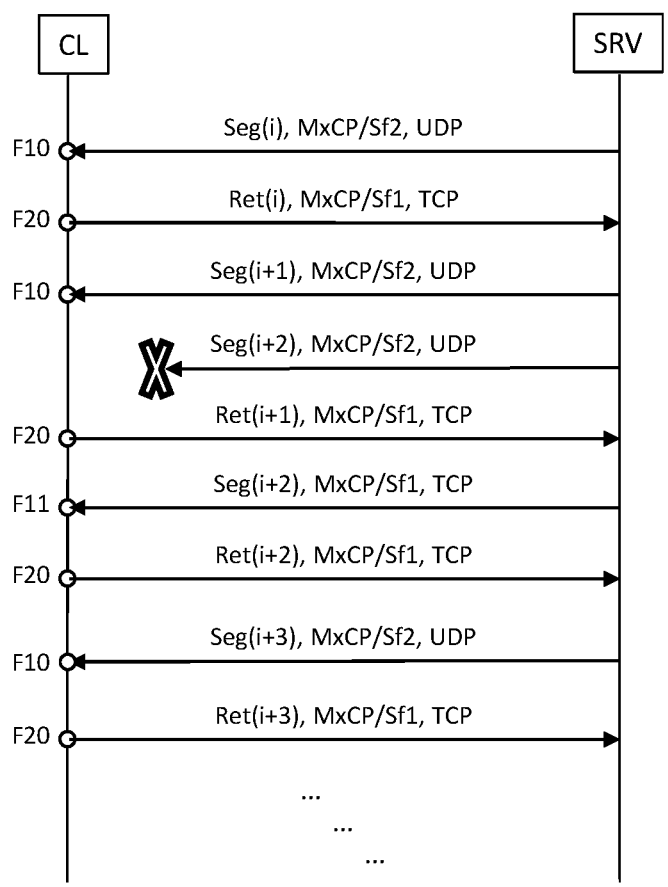
Figure 3:
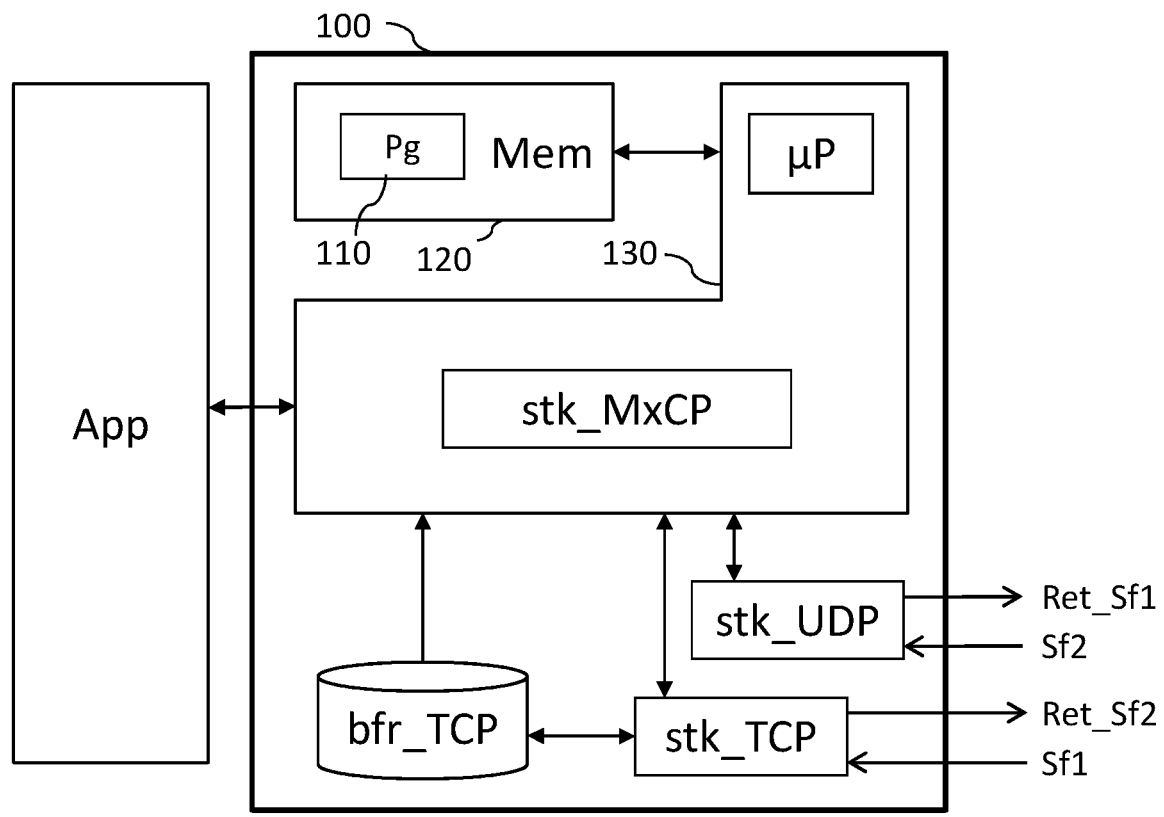

Other advantages and features of the invention will become more clearly apparent on reading the following description of one particular embodiment of the invention, given by way of simple illustrative and non-limiting example, and of the appended drawings, among which:

FIG. 1 presents a first exemplary implementation of the method for managing data packets according to the invention, FIG. 2 presents a second exemplary implementation of the method for managing data packets according to the invention, FIG. 3 presents an exemplary structure of a management device implementing the management method, according to one aspect of the invention.

6. DETAILED DESCRIPTION OF AT LEAST ONE EMBODIMENT OF THE INVENTION

In the remainder of the description, examples of several embodiments of the invention based on TCP and UDP are presented, but the invention is not limited to these examples. The invention applies for example to streams in connectionless mode, such as UDP-lite streams, or any stream similar to UDP but capable of transmitting a read pointer.

It is recalled that MPTCP encodes its parameters in the TCP field with a maximum length of 40 bytes. Said field is composed of a "Kind" parameter of one byte, of a "Length" parameter of one byte and of a "Subtype" parameter of 4 bits. The maximum remaining length for the value of an MPTCP field is therefore 37 bytes and 4 bits.

An "IP stack" is the name given to the stack of software layers each separately managing a protocol in a sending or receiving entity. All of the data exchanged between two entities pass through the two software stacks of the client and of the server. "MxCP stack" is the name given hereinafter to only that software layer that interfaces between the data-consuming application and the TCP or UDP software layer.

It is recalled that, although a TCP packet transmits its data in what is called a segment, TCP is designed to transport two sequences of bytes, one in each direction between the two entities at each end of the connection. In the header of a TCP packet, there is therefore a pointer to the data transmitted by the sender ("Sequence Number" field of 4 bytes) of this TCP packet and a pointer to the data effectively received by this same sender in the other direction ("Acknowledgment Number" TCP field of 4 bytes). This field is used to manage the retransmissions. It identifies the segment sent by the sender: the sender deems that a segment has been received by the other end if and only if this segment has been acknowledged by the receiver in the "Acknowledgment Number" field. The sender retransmits this segment in a spaced-apart manner for as long as it has not received its acknowledgment (between 3 and 15 times depending on the implementations; for example 5 in Windows OS).

TCP regulates the bit rate of a connection by controlling the gap between the write pointer and the read pointer.

In the remainder of this document, the pointer to the sent data is called write pointer, and the pointer to the received data is called read pointer.

New MxCP Protocol

The invention makes possible a new protocol improving on MPTCP and called MxCP below. Like the MPTCP protocol, the API (Application Programming Interface) of MxCP is based on what are termed 'socket' functions, setsockopt( ) and getsockopt( ).

The MxCP protocol hinges on the message MxCP_CAPABLE, which activates an MxCP connection sharing a TCP stream and a UDP stream. Its parameter indicates to the recipient at least the associated UDP port number.

The MxCP parameters are encoded in accordance with section 3 of rfc6824: length, parameter identifier; value.

The value of these parameters is encoded in binary in a known manner (IPv4 address on 4 bytes, integer, etc.).

Appendix A provides, by way of example, a list of other primitives on which the API of MxCP may be based.

It is possible to implement MxCP as an extension of MPTCP, that is to say a modification of MPTCP, or as a new TCP option.

MxCP, Extension of MPTCP

The MPTCP protocol is identified by the value 30 in the "Option-Kind" field of the TCP packet. In this mode, the parameters are identified as new MPTCP subtypes, in accordance with section 8 of rfc6824, and encoded as described in section 3 of rfc6824. This mode is identified by the "version" field or by one of the flags of the value of the field MP_CAPABLE described in section 3.1 of rfc6824.

MxCP, New TCP Option

This is an implementation similar to MPTCP but that is independent. In this mode, similarly to MPTCP, MxCP is identified for example by the value 31 in the "Option-Kind" TCP field of the TCP packet. The MxCP parameters are identified separately and encoded in accordance with the format described in section 3 of rfc6824. The operation is identical to the preceding mode, but is incompatible with MPTCP.

MxCP, Implemented Using a UDP Version Derived from UDP-Lite, MxUDP

In one particular mode, the first stream is of TCP type and at least the first UDP stream is of a new type derived from UDP-lite, called MxUDP, enabling at least the acknowledgment of the TCP segments on the MxUDP stream:

UDP-lite (rfc3828) is an existing protocol derived directly from UDP. It complies with the UDP format, but divides the 32-bit UDP "Checksum" field into two so as to create a 16-bit "Checksum Coverage" field and a 16-bit "Checksum" field.

MxUDP also complies with the UDP format and also divides the 32-bit UDP "Checksum" field into two fields:
a 16-bit "MxUDP_control" field.
a 16-bit "MxUDP_Checksum" field.

The "MxUDP_control" field is divided into two elements:
MxUDP_Type (4 bits)
and MxUDP_Len (12 bits).

Appendix B describes the 'MxUDP_Type' field, which indicates the type of MxUDP message.

MxCP, Rudimentary Implementation

A rudimentary implementation is possible with MxCP as an extension of MPTCP or MxCP as a TCP option. Only the message MxCP_CAPABLE is necessary; it is carried in the first message SYN of the TCP stream or in the first message of the MxUDP stream.

One example of a simple implementation, illustrated in appendix C, enables the activation of a unidirectional multicast IP stream as far as the subnetwork connecting the client. In this case, the MxCP parameter also describes the multicast IP address of the requested UDP stream. The access network captures the TCP message SYN and extracts the address of the multicast stream therefrom. This replaces the IGMP message JOIN usually sent by a multicast IP receiver.

FIG. 1 presents a first exemplary implementation of the method for managing data packets according to the invention. This example illustrates the application of the invention upon receipt of MPEG frames that are used for video streams and particularly for IPTV streams.

An MxCP connection is set up between a client CL and a server SRV in order to transmit data of MPEG type (IPTV) from the server to the client. A TCP stream Sf1 may exist by default, in which case the two entities CL and SRV modify the TCP connection into an MxCP connection by sending a message MxCP_CAPABLE, for example with the following options:

```
{
"MxCP_CANCEL_DELAY": 10ms,
"MxCP_CONGESTION_ASYNC_NOTIFICATION_ENABLE": 3
}
```
At this stage, the streams Sf1 and Sf2 are therefore created.

The client CL creates, in addition to the streams Sf1 and Sf2, a new UDP stream Sf3 in the MxCP connection, for example by sending a message similar to the message MP_JOIN of the MPTCP protocol.

The MPEG data to be transmitted are frames of three types, distinguished from one another by different characteristics, such as resolution, renewal frequency, etc.: I-frames, B-frames and P-frames. The server SRV chooses to transmit the I-frames on the TCP stream, the B-frames on Sf2 and the P-frames on Sf3. It therefore calls on the primitive setsockopt( ) using the parameter MxCP_PREF so as to recall its preferences when sending the data of the I-frames (setsockopt(MxCP_PREF, 'Sf1')), when sending the data of the B-frames on Sf2 (setsockopt(MxCP_PREF, 'Sf2')) and of the P-frames on Sf3 (setsockopt(MxCP_PREF, 'Sf3')).

The maximum size of a TCP segment, measured in bytes, is negotiated by the MSS (Maximum Segment Size) parameter when the TCP connection is opened. In the case of UDP packets, reference is made to UDP datagrams. The maximum size of a UDP packet is not negotiated.

The MxCP stack of the server SRV transmits, on the stream Sf1, the I-frames in TCP segments, that is to say sets of consecutive TCP packets, while keeping a read pointer to the last datum successfully received by the client CL (last byte of the last segment whose acknowledgment has been received by the server) and a write pointer to the last datum transmitted by the server SRV (last byte of the last segment sent), this being a normal TCP operation.

During a step E10, the client CL receives the first packets of the (i)th I-frame via the stream Sf1.

During a step E11, the client CL receives the first packets of the (j)th B-frame via the stream Sf2.

During a step E12, the client CL receives the first packets of the (k)th P-frame via the stream Sf3.

Following losses of packets, the server SRV retransmits packets of the (i)th I-frame, thereby generating a delay and creating a data starvation in the decoder of the client CL.

During a step E20, after a delay of 10 milliseconds corresponding to MxCP_CANCEL_DELAY, the client CL deems that the data of this I-frame will arrive too late to be decoded and displayed and that, in addition, the corresponding packets (together with the associated B-frame and I-frame packets) and their retransmissions will prevent and delay the arrival of the packets of the following I-frame. It therefore forces the acknowledgment, on Sf2, of the non-useful packets and advances the read pointer accordingly. Using a calculation, one example of which is given further below, it determines the last byte of the packet to be acknowledged, that is to say the last packet before the start of the following I-frame, so as to obtain the data of the following I-frame, that is to say the (i+1)th I-frame, as quickly as possible. Optionally, the client CL may carry out this acknowledgment on the stream Sf3 (step E21), or on the two streams Sf2 and Sf3 at the same time, so as to increase the chances of stopping the retransmission of the non-useful packets.

The MxCP stack of the server SRV receives the acknowledgment message on the UDP stream Sf2, comprising the pointer acknowledging the read, that is to say the so-called receipt of all of the packets of the (i)th I-frame by the client CL.

The MxCP stack of the server SRV therefore positions the read pointer of the TCP stream Sf1 at this location (the packet containing the first byte of the following I-frame) and stops the retransmission of the preceding packets. It therefore focuses on the transmission of the data packets of this I-frame and of the following frames.

During a step E30, the client CL therefore receives the first packets of the (i+1)th I-frame via the stream Sf1.

In addition, the server SRV deems the other data associated with the other types of B-frame or P-frame that are situated sequentially before the end of the last received I-frame to have been sent, and forces the positioning of the write pointers of Sf2 and Sf3 to the last packet of the following I-frame so as to start to transmit the B-frames and P-frames on the streams Sf2 and Sf3.

During a step E31, the client CL therefore receives the first packets of the (j+1)th B-frame via the stream Sf2.

During a step E32, the client CL therefore receives the first packets of the (k+1)th P-frame via the stream Sf3.

Optionally, during a step E40, the client CL may use the ECN-Echo flag in the TCP packets acknowledging the receipt of the data of the following I-frames, so as to indicate to the server SRV that it needs to reduce its bit rate.

The server SRV receives this indication and chooses a lower encoding bit rate. It uses for example smaller I-frames so as to have a lower encoding bit rate for the same quality.

Optionally, the server will advantageously already have made this choice to reduce the bit rate during the forcing of the positioning of the write pointers of Sf2 and Sf3 in the preceding step, thereby avoiding recourse to the ECN-Echo flag.

FIG. 2 presents a second exemplary implementation of the method for managing data packets according to the invention. In this example, the data of the TCP stream are transmitted on UDP but retransmitted and acknowledged on TCP. This example applies when a service wishes to differentiate the QoS of the retransmitted packets in order to speed up the retransmission of the segments to be retransmitted for an IPTV service so as to avoid distortion of the decoded image following losses of data, and/or in order to slow down the retransmission packets in relation to the set of the initial packets so as to force the reduction of the bit rates of the streams in question.

An MxCP connection is set up between a client and a server in order to transmit data of an MPEG stream from the server to the client. Each datum comprises a certain number of packets. A TCP stream Sf1 and a stream Sf2 therefore exist between two client and server entities.

The connection is created by sending a message MxCP_CAPABLE with the option {port:0} indicating that the UDP port is the same as the TCP port.

The server transmits the TCP segments on the UDP stream Sf2, which segments are received by the client during successive steps F10 (Seg(i), Seg(i+1)).

During corresponding steps F20 (Ret(i), Ret(i+1)), the client acknowledges the receipt of the data on the TCP stream Sf1 by transmitting a read pointer aligned with the last received TCP segment.

The server keeps the read pointer received from the client and a write pointer to the last transmitted datum up to date, this reflecting a normal TCP operation, with the exception that it is coupled with UDP.

If, like the second step F20 of FIG. 2, a step F20 is carried out with one or more segments which are late, by virtue of the read pointer aligned with the last received datum, the server infers the lack of receipt of this or these non-received segment(s) on sf2 (Seg(i+2)). The server knows that it has already sent this or these segment(s) and retransmits them on the TCP stream Sf1, said segments being received by the client during a step F11 (Seg(i+2)), this being the normal TCP operation from which MxCP benefits in this case, by virtue of the invention.

In parallel, the server continues to transmit, on the UDP stream Sf2, data situated after its write pointer (step F10 with Seg(i+3) onward).

During a step F20, the client acknowledges the receipt of the retransmitted segments on the TCP stream Sf1 by increasing the value of its read pointer as a result. The server aligns its read pointer with this value.

It is understood that, by virtue of the invention, the MxCP protocol benefits both from the real-time efficiency inherent to UDP and from the error repair possibilities inherent to TCP.

In some embodiments of the invention, the client has to send a read pointer to pending data, that is to say data that have not yet been received, to the server. This pointer then has to be inferred or calculated by the application in the client, or by the MxCP stack of the client. This is the case for example when the application of the client wishes to avoid starvation of its decoding buffer. When the MxCP connection is created, the application of the client indicates to the MxCP stack, in the parameter MxCP_CANCEL_DELAY, that it wishes to ignore data that arrive 3 ms too late. During the transmission of the data, the application of the client detects that its decoding buffer is almost empty and uses the primitive setsockopt(MxCP_CANCEL_DELAY,3) to report this to the MxCP stack.

The MxCP stack of the client converts this delay into a number of segments. For example, it estimates the number N of segments currently being retransmitted on the basis of the differences between the arrival times of the segments framing missing segments (example: segment 14 is received at the time 495 milliseconds. Its predecessor, segment 9, is received 3 milliseconds earlier, at the time 492 milliseconds. Segments 10, 11, 12 and 13 are therefore not yet received. N therefore has a value of 4). The MxCP stack asks the server to stop the retransmission of this sequence by forcing the advancement of its read pointer: it forces the acknowledgment, via the UDP stream, of these N segments by transmitting a read pointer aligned with the last byte of segment 14.

The server then advances its read pointer to the last byte of segment 14. The retransmission of the packets that have not been received by the client is stopped, thus freeing up space on the links and in the buffers of the devices being passed through so as to make up for the accumulated delay.

In relation to FIG. 3, an exemplary structure of a management device is now presented according to one aspect of the invention.

The management device 100 implements the management method, various embodiments of which have just been described.

Such a device 100 may be implemented in any entity receiving a data stream, whether this be in connected mode or in connectionless mode, this receiving entity also comprising an application module App consuming the data stream.

For example, the device 100 comprises a processing unit 130, equipped for example with a microprocessor μP, and driven by a computer program 110, stored in a memory 120 and implementing the management method according to the invention. On initialization, the code instructions of the computer program 110 are for example loaded into a RAM memory, before being executed by the processor of the processing unit 130.

Such a device 100 comprises:
- a first sending/receiving module stk_TCP, able to send (Ret_Sf2) and receive (Sf1) a stream in connected mode,
- a second sending/receiving module stk_UDP, able to send (Ret_Sf1) and receive (Sf2) a stream in connectionless mode,
- a buffer memory bfr_TCP, able to store data received from a stream in connected mode,
- a processing module stk_MxCP, able to analyze a stream received on one of the first or second sending/receiving modules stk_TCP or stk_UDP, to determine whether a return message has to be sent, to generate the content thereof, and to ask the other sending/receiving module stk_UDP or stk_TCP to send the return message.

The processing module stk_MxCP communicates with the application module App, for example using primitive functions, such as described in the table in appendix A.

The modules described in relation to FIG. 3 may be hardware modules or software modules.

The module stk_TCP may be a TCP stack. The module stk_UDP may be a UDP stack, a UDP-lite stack or an MxUDP stack.

The exemplary embodiments of the invention that have just been presented are merely a few of the conceivable embodiments. They show that the invention makes it possible to benefit, with a packet connection, from the advantages both of streams in connected mode, such as TCP, and of streams in connectionless mode, such as UDP.

APPENDIX A

| primitives of the API of MxCP | |
|---|---|
| Symbol | Comment |
| MxCP_CAPABLE<br>'flowType': 2 bits { UDP, UDP-lite, MxUDP }<br>'port': 2 bytes Integer<br>Value 0: the UDP port is the same as the TCP port<br>Value N: the UDP port is 'N'<br>'addressType': Boolean, optional { Ipv4 or IPv6 }<br>Transmitted in MxCP header<br>Identifier 0x8 | Activates MxCP option in MPTCP.<br>Indicates to the receiver that the UDP stream is active on the sender side.<br>Tells the 'network' functions to open the associated UDP port (UDP port in the NATs so as to dispense with a protocol such as STUN (Simple Traversal of User Datagram Protocol through Network Address Translators, rfc3489)). |

APPENDIX A-continued primitives of the API of MxCP

| Symbol | Comment |
| --- | --- |
| MxCP_CONGESTION_SYNC_NOTIFICATION_ENABLE<br>Integer [1..255]<br>Value: number of received ECT bits that will trigger the ECN-Echo congestion reporting on the other stream.<br>Transmitted: Transmission of the parameter to the other end is optional | Activates ECN-Echo on the UDP and TCP streams.<br>Asks the other end to activate ECN on the received streams. |
| MxCP_CONGESTION_ASYNC_NOTIFICATION_ENABLE<br>Integer [1..255]<br>Value: Number of received consecutive ECT bits (or received in the same period of time) that triggers the report | Activates ECN-Echo on the TCP stream only.<br>Asks the other end to activate ECN on the received streams.<br>Activates sending of the ECN-Echo indication in place of the ECN bits in the UDP stream. |
| MxCP_CANCEL_DELAY<br>Integer [1..255]<br>Transmitted in MxCP header<br>Identifier 0x9 | Delay between the time of sending of the segment of the write pointer and the time of sending of the read pointer, on the basis of which some segments are to be discarded (on the basis of which the read pointer of the sender has to perform a hop). |
| MxCP_SUB_FLOW_READ_ONLY<br>'flowType': 2 bits { UDP, UDP-lite, MxUDP }<br>"addressType": Boolean { Ipv4 or IPv6 }<br>'unicast': Boolean<br>'port': Integer[0..63536]<br>Value 0: the UDP port is the same as the TCP port<br>Value N: the UDP port is 'N'<br>Address: bytes [4] or bytes[16]<br>Transmitted in MxCP header<br>Identifier 0xA | Indicates to the receiver that the UDP stream is active on the sender side in read only.<br>Indicates to the 'network' functions that it is a unidirectional stream and that the receiver is therefore not authorized to send on this UDP stream.<br>Multicast == 1: Tells the functions of a multicast network such as PIM SSM to prepare the multicast network such that the multicast tree is able to deliver the UDP stream:<br>Activation of the receipt of the source corresponding to the TCP sender;<br>activation of the multicast traffic in the network of attachment of the receiver (capture of the message MXCP SUB_FLOW_READ_ONLY by the access routers);<br>implementation of the multicast network between the source and the network of association of the UDP receivers (PIM protocol function in the routers triggered by the access routers); |
| MxCP_PREF:<br>Value: id of the substream to be used<br>Not transmitted in MxCP header<br>ADD_ADDR<br>REMOVE_ADDR<br>MP_PRIO<br>MP_FAIL<br>MP_FASTCLOSE | Selects the stream to preferably be used for sending the data. The algorithm of the stack may choose another stream given the state of the connection.<br>The MxCP stack uses the initial TCP stream by default.<br>The other MPTCP parameters are taken up in MxCP. Their semantics are retained. |

APPENDIX B structure of the MxUDP_Type field

| MxUDP_Type | MxUDP message |
| --- | --- |
| Bit 0 to 0 | reserved |
| Bit 0 to 1 | transports a TCP segment to the data part of the UDP message; transports the TCP "sequence number" and "Acknowledgment number" fields in the "MxUDP_Data" field. "MxUDP_Len" indicates the length of the "MxUDP_Data" field and has a value of 12. PS: The maximum length of the "MxUDP_Data" field is 12 bytes so as to guarantee space for transporting a TCP segment: Specifically, the size of the TCP header is at least 12 bytes longer than the UDP header. A length of the "MxUDP_Data" field of 12 bytes therefore leaves enough space to transport the data of a TCP segment in all cases. |
| Bit 1 to 3 | Reserved |

APPENDIX C simple example of a message MxCP_CAPABLE

| Symbol | Comment |
| --- | --- |
| MxCP_CAPABLE | Activates MxCP option in MPTCP. |
| exemplary value { | Indicates to the receiver that the UDP stream is active on the sender side. |
|     port: 0 | |
|     readonly: 0 | Tells the 'network' functions to open the associated UDP port. |
|     multicast: 1 | Value 0: the UDP port is the same as the TCP port |
|     addrType: 'ipv4' | Value N: the UDP port is 'N' |
|     addr: '224.1.1.1' | Readonly == 1: Indicates to the message recipient that the UDP stream is active but in read only (normal case in which a client connects to a server and in which the server sends the content). Indicates to the 'network' functions that it is unidirectional and that the receiver is therefore not authorized to send on this UDP stream. |
| } | Multicast == 1: The 'network' functions may prepare the multicast network such that the multicast tree is able to deliver the UDP stream: activation of the receipt of the source and preparation of the multicast network upstream of the network of attachment of the receiver |

Although the present disclosure has been described with reference to one or more examples, workers skilled in the art will recognize that changes may be made in form and detail without departing from the scope of the disclosure and/or the appended claims.

The invention claimed is:

1. A method for managing data packets in a receiving entity, wherein the method comprises:
receiving the data packets from a transport layer connection set up with a sending entity, wherein the connection comprises at least one transmission control protocol (TCP) stream and at least one stream in connectionless mode, the stream in connectionless mode being of unidirectional multicast Internet protocol (IP) type with an ECN capable transport (ECT) bit activated in IP headers of the packets of the stream,
sending, by the receiving entity, a message, termed a return message, relating to at least one data packet from the stream in connectionless mode of the connection, the return message being sent to the sending entity on the TCP stream of the connection, the return message being related to the stream in connectionless mode and comprising an explicit congestion notification (ECN)-Echo flag.

2. The management method as claimed in claim 1, in which the return message comprises a read pointer to a data packet of the stream in connectionless mode.

3. A device for managing, in a receiving entity, data packets received from a connection set up with a sending entity, comprising:
a processor; and
a non-transitory computer-readable medium comprising instructions stored thereon, which when executed by the processor configure the device to implement:
a first sending/receiving module configured to send and receive a transmission control protocol (TCP) stream; and
a second sending/receiving module configured to send and receive a stream in connectionless mode,
wherein the connection comprises at least one TCP stream and at least one stream in connectionless mode, the stream in connectionless mode being of unidirectional multicast Internet protocol (IP) type with an ECN capable transport (ECT) bit activated in IP headers of the packets of the stream, and
wherein the first sending/receiving module sends a message, termed a return message, relating to at least one data packet received by the second sending/receiving module, the return message being related to the stream in connectionless mode and comprising an explicit congestion notification (ECN)-Echo flag.

4. A non-transitory computer-readable recording medium comprising instructions stored thereon, which when executed by a processor of a receiving entity configure the receiving entity to:
receive data packets from a transport layer connection set up with a sending entity, wherein the connection comprises at least one transmission control protocol (TCP) stream and at least one stream in connectionless mode, the stream in connectionless mode being of unidirectional multicast Internet protocol (IP) type with an ECN capable transport (ECT) bit activated in IP headers of the packets of the stream, and
sending, by the receiving entity, a message, termed a return message, relating to at least one data packet from the stream in connectionless mode of the connection, the return message being sent to the sending entity on the TCP stream of the connection, the return message being related to the stream in connectionless mode and comprising an explicit congestion notification (ECN)-Echo flag.

* * * * *